United States Patent
Katti (10) Patent No.: US 12,437,791 B2
(45) Date of Patent: Oct. 7, 2025

(54) MAGNETO RESISTIVE MEMORY FOR MONOLITHIC DATA PROCESSING

(71) Applicant: Honeywell International Inc., Charlotte, NC (US)

(72) Inventor: Romney R. Katti, Shorewood, MN (US)

(73) Assignee: Honeywell International Inc., Charlotte, NC (US)

( * ) Notice: Subject to any disclaimer, the term of this patent is extended or adjusted under 35 U.S.C. 154(b) by 175 days.

(21) Appl. No.: 18/350,372

(22) Filed: Jul. 11, 2023

(65) Prior Publication Data

US 2025/0022497 A1    Jan. 16, 2025

(51) Int. Cl.
G11C 11/00    (2006.01)
G11C 11/16    (2006.01)

(52) U.S. Cl.
CPC ........ G11C 11/161 (2013.01); G11C 11/1673 (2013.01); G11C 11/1675 (2013.01)

(58) Field of Classification Search
CPC .............. G11C 11/161; G11C 11/1675; G11C 11/1659; G11C 11/1673; G11C 11/16; G11C 11/1655; G11C 11/1657; G11C 13/0004; G11C 13/0007; G11C 13/0011; G11C 13/0014; G11C 13/0026; G11C 13/003; G11C 13/0069; G11C 2013/0073; G11C 2013/0078; G11C 2213/70; G11C 2213/79; G11C 2213/82; G11C 11/15; G11C 5/02; G11C 7/10; G11C 11/1653; G11C 11/5607
USPC .......................... 365/157, 158, 171, 172, 173
See application file for complete search history.

(56) References Cited

U.S. PATENT DOCUMENTS

| | | | |
|---|---|---|---|
| 4,736,290 A | 4/1988 | McCallion | |
| 5,809,336 A | 9/1998 | Moore et al. | |
| 9,196,334 B2 | 11/2015 | Kang et al. | |
| 10,811,068 B2 * | 10/2020 | Li | H10B 61/22 |

(Continued)

FOREIGN PATENT DOCUMENTS

EP    2839462 A1    2/2015

OTHER PUBLICATIONS

Apalkov et al., "Progress and Prospects of Spin Transfer Torque Random Access Memory," IEEE Transactions on Magnetics, vol. 48, No. 11, doi: 10.1109/TMAG.2012.2198451, Nov. 2012, pp. 3025-3030.

(Continued)

Primary Examiner — Thong Q Le
(74) Attorney, Agent, or Firm — Shumaker & Sieffert, P.A.

(57) ABSTRACT

An example apparatus includes a single die, the single die including a first set of one or more magnetic tunnel junction (MTJ) elements comprising a first anisotropy that results in the first set of one or more magnetic tunnel junction elements being configured to perform a write operation at a first write speed. The single die further includes a second set of one or more MTJ elements comprising a second anisotropy that results in the second set of one or more MTJ elements being configured to perform a write operation at a second write speed different from the first write speed. The single die further includes processing circuitry configured to cache data at the first set of one or more MTJ elements for short-term storage and to store data at the second set of one or more MTJ elements for long-term storage.

20 Claims, 8 Drawing Sheets

(56) References Cited

U.S. PATENT DOCUMENTS

| | | |
|---|---|---|
| 2011/0316103 A1 | 12/2011 | Uchida et al. |
| 2013/0201757 A1 | 8/2013 | Li et al. |
| 2014/0010006 A1 | 1/2014 | Rao et al. |
| 2016/0118102 A1 | 4/2016 | Abedifard et al. |
| 2016/0267957 A1 | 9/2016 | Lu et al. |

OTHER PUBLICATIONS

Barla et al., "Spintronic devices: a promising alternative to CMOS devices," Journal of Computational Electronics, vol. 20, doi.org/10.1007/s10825-020-01648-6, Jan. 19, 2021, pp. 805-837.

Chen et al., "Progress and Prospects of Spin Transfer Torque Random Access Memory," IEEE Transactions on Magnetics, vol. 48, No. 11, Nov. 2012, pp. 3025-3030.

Ikegawa et al., "Magnetoresistive Random Access Memory: Present and Future," IEEE Transactions on Electron Devices, vol. 67, No. 4, Apr. 2020, pp. 1407-1419.

Jog et al., "Cache Revive: Architecting Volatile STT-RAM Caches for Enhanced Performance in CMPs," DAC Design Automation Conference 2012, DOI: 10.1145/2228360.2228406, Jul. 19, 2012, 17 pp.

Liu et al., "A Statistical STT-RAM Retention Model for Fast Memory Subsystem Designs," Published in: 2017 22nd Asia and South Pacific Design Automation Conference (ASP-DAC), IEEE, DOI: 10.1109/ASPDAC.2017.7858409, Feb. 2017, 6 pp.

Marino et al., "System Implications of LLC MSHRs in Scalable Memory Systems," Microprocessors and Microsystems, vol. 52, DOI: 10.1016/j.micpro.2016.12.007, Dec. 2016, pp. 355-364.

Rizzo et al., "A Fully Functional 64 Mb DDR3 ST-MRAM Built on 90 nm CMOS Technology," IEEE Transactions on Magnetics, vol. 49, No. 7, doi: 10.1109/TMAG.2013.2243133, Jul. 2013, pp. 4441-4446.

Tillie et al., "Data Retension Extraction Methodology for perpendicular STT-MRAM," IEEE, International Electron Devices Meeting (IEDM), Feb. 2017, 4 pp.

Wang et al., "Development of STT-MRAM for embedded memory applications," TDK Headway Technologies, Inc., Jun. 2017, pp. 34.

Wolf et al., "The Promise of Nanomagnetics and Spintronics for Future Logic and Universal Memory," Proceedings of the IEEE, vol. 98, No. 12, doi: 10.1109/JPROC.2010.2064150, Dec. 2010, pp. 2155-2168.

\* cited by examiner

MAGNETO RESISTIVE MEMORY FOR MONOLITHIC DATA PROCESSING

TECHNICAL FIELD

This disclosure relates to memory devices and, more specifically, to magnetic devices.

BACKGROUND

Most modern electronic devices include a power source, components for storing data, components for processing data, components for receiving user input, and components for delivering user output. It is desirable for such electronic devices to have long battery life, powerful processing capabilities, and large amounts of data storage, but at the same time, it is also desirable for electronic devices to maintain small and lightweight form factors. To meet these conflicting demands, it is desirable for the components of these devices to become smaller with better performance.

It is generally desirable for memory components, for example, to store more data in a smaller space with faster read and write operations. Current types of non-volatile memory include electro-mechanical hard drives where read/write heads read and write data from and to a series of rotating disks. Other types of non-volatile memory include solid state memories that use transistors and other devices (e.g., capacitors, floating gate MOSFETs, etc.) to store data without any moving parts and with faster read and write access.

SUMMARY

This disclosure generally describes techniques for configuring magnetic devices to support memory devices with different data retention and/or access speeds that support monolithic processes, which may permit data processing with storage components within a single die. Magnetic devices may include, for example, a memory device comprising a magneto-resistive random access memory (MRAM), such as, for example, magnetic tunnel junction (MTJ) element and/or spin-torque transfer MRAM (STT-MRAM).

In one example, an apparatus includes a single die, the single die including: a first set of one or more magnetic tunnel junction (MTJ) elements comprising a first anisotropy that results in the first set of one or more magnetic tunnel junction elements being configured to perform a write operation at a first write speed; a second set of one or more MTJ elements comprising a second anisotropy that results in the second set of one or more MTJ elements being configured to perform a write operation at a second write speed different from the first write speed; and processing circuitry configured to cache data at the first set of one or more MTJ elements for short-term storage and to store data at the second set of one or more MTJ elements for long-term storage.

In another example, a single die includes: a first set of one or more magnetic tunnel junction (MTJ) elements comprising a first anisotropy that results in the first set of one or more magnetic tunnel junction elements being configured to perform a write operation at a first write speed; a second set of one or more MTJ elements comprising a second anisotropy that results in the second set of one or more MTJ elements being configured to perform a write operation at a second write speed different from the first write speed; and processing circuitry configured to cache data at the first set of one or more MTJ elements for short-term storage and to store data at the second set of one or more MTJ elements for long-term storage.

The details of one or more aspects of the disclosure are set forth in the accompanying drawings and the description below. Other features, objects, and advantages of the devices, systems, methods, and techniques described in this disclosure will be apparent from the description and drawings, and from the claims.

DETAILED DESCRIPTION

Some computational and data systems have physically separate components between the processor, which would have a data cache, memory, and data storage. Such configurations can experience throughput limitations and timing delays/latencies when data need to move between die; and are common commercially and in applications for space computing, trusted computing, and/or where radiation hardness is beneficial.

Establishing a design and technology platform in which processing circuitry, cache, memory, and data storage functions can exist monolithically on a single die would support realizing greater computational throughput and efficiency for commercial applications. Establishing such a design and technology platform may provide radiation hardness and nonvolatility that support various applications. Energy consumption and power and heat dissipation can be reduced and operation in critical environments such as radiation environments may be provided.

This disclosure is directed to a monolithic data system solution increase throughput, reduce power and heat dissipation, while providing functionality in radiation environments, a with monolithic chip reliability, and reduced system and packaging costs. Some approaches may have separate die for each function.

Techniques described herein may allow for monolithic integration, which may help to increase performance and resource efficiency to support advancement compared to systems using a separate die for each function (e.g., a die for layer 1 (L1) cache and another die for L2 cache). Board-level and Multi-Chip Modules (MCMs) would not be necessary and could be replaced by a single die or single packaged die. Integrated single die and/or single packaged die could themselves be used on boards and/or MCMs to achieve yet higher levels of integration, performance, and/or efficiency.

The initial envisioned flow can use a design and technology platform to enable integrating processor, cache, memory, and data storage functions monolithically that could support various applications including, for example, applications benefiting from provide radiation hardness and nonvolatility. For example, silicon on insulator (SOI) complementary metal-oxide semiconductor (CMOS), or bulk CMOS as an alternative, could be integrated at a particular node with technologically common magnetic devices that could be deposited and patterned monolithically with, e.g., above, the silicon devices. Vias could be used to connect to the magnetic devices with the silicon devices monolithically, such that connections would not need to be made between dice with the associated latencies, complexity, and signal conditioning. A processor could be made from silicon devices. The cache (e.g., L1 and/or L2, etc.), memory, non-volatile memory, and/or storage could be made from magnetic devices integrated with silicon devices. The memory and data storage hierarchy could be implemented monolithically on a single die, with the deposition and patterning of the magnetic devices modified between the cache, memory, and storage functions to optimize and account for differences and trade-offs needed to attain needed performance such as with speed and data retention time. For example, the cache may operate with sub-nanosecond speed with millisecond data retention time for tens of kilobits, while data storage may store megabits with greater than ten-year data retention time at speeds of tens of nanoseconds, and the memory and non-volatile memory elements would have in-between characteristics. As the technology node and feature sizes are reduced, scaling to higher densities and capacities could result. Multi-level processing could be used but may not be required. One magnetic deposition and patterning sequence could be expected per supported magnetic memory element type.

Figure 1:
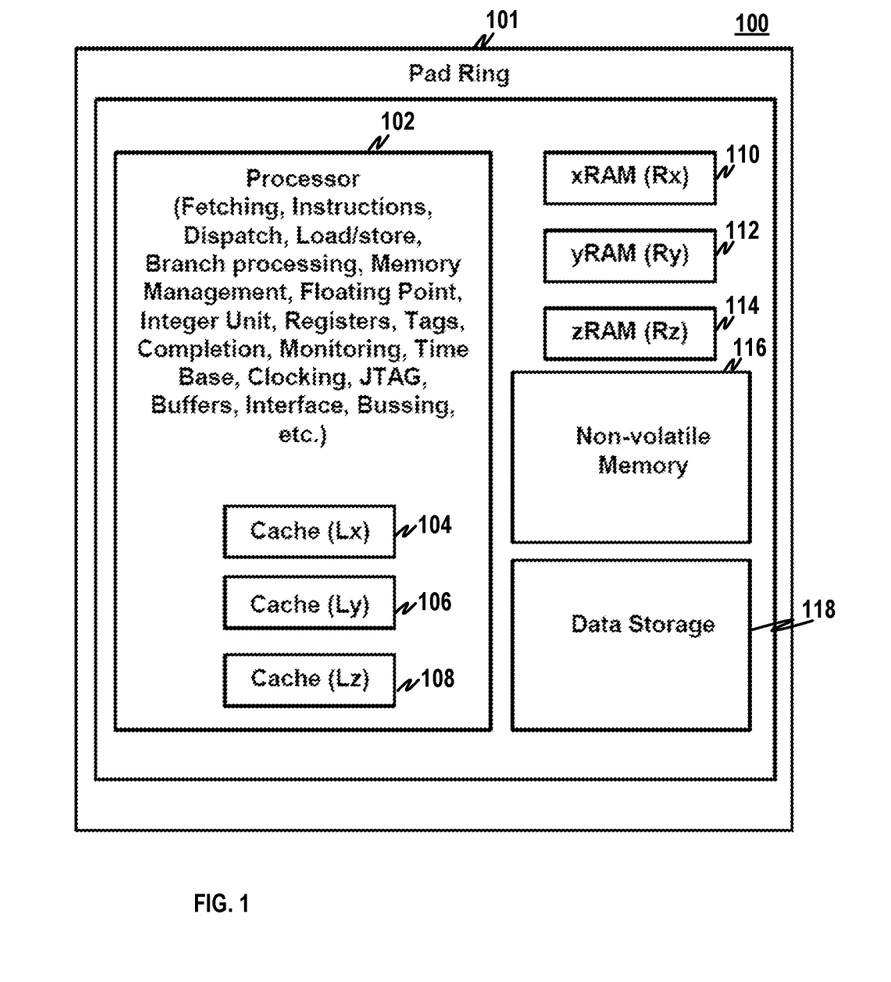
FIG. 1 shows a conceptual illustration of a system implemented on a single die that includes processing circuitry, a first set of one or more magnetic tunnel junction elements (MTJs), and a second of one or more MTJs, in accordance with the techniques of the disclosure.

FIG. 1 shows a conceptual illustration of a system implemented on a single die 100 that includes a pad ring 101, processing circuitry 102 (e.g., a processor), a first set of one or more magnetic tunnel junction elements (MTJs) 104 (also referred to herein as cache Lx 104), and a second of one or more MTJs 106 (also referred to herein as cache Ly 106 and/or cache Lz 108), in accordance with the techniques of the disclosure. Processing circuitry 102 may be configured to perform one or more actions relating to: fetching, instructions, dispatch, load, store, branch processing, memory management, floating point, integer unit, registers, tags, completion, monitoring, time base, clock, Joint Test Action Group (JTAG), buffers, interface, or bussing. Single die 100 may also optionally include zero or more of, for example, cache Lz 108, xRam 110, yRam 112, zRAM 114, non-volatile memory 116, and data storage 118. Caches 104-108, RAMs 110-114, non-volatile memory 116, and data storage 118 may represent unique magnetic memory element types. For example, data storage 118 may represent a magnetic memory element type that has relatively high data retention characteristic but slower access speeds compared to caches 104-108, RAMs 110-114, and non-volatile memory 116.

Techniques described herein may allow for a construction of computational and data processing capability in silicon (Si) and CMOS, integrated with a multiplicity of MTJ types processed monolithically on single die 100 in a single level or at multiple levels. For example, cache 104 may use Spin-Transfer Torque (STT) MTJ technology, for example, with selected speed and data retention attributes with suitable endurance, etc., to allow data processing; L1, L2, and/or L3 cache, etc. xRAM 110 may be functionally equivalent to dynamic and/or static random access memory. Non-volatile memory 116 and/or data storage 118 may be functionally equivalent to dynamic and/or static random access memory. Selection and sizing of the memory types with processing may support monolithic design for the configuration and interfaces. Optimization for power and heat dissipation may be additional considerations.

Caches 104-108, RAMs 110-114, non-volatile memory 116, and data storage 118 may include MTJ variants that support creating memory hierarchies in a monolithic integrated die with an MTJ back end of line (BEOL) process integrated with Si and/or CMOS devices and electronics in architectures that support computation and data processing.

In accordance with the techniques of the disclosure, caches 104-108, RAMs 110-114, non-volatile memory 116, and data storage 118 may be integrated with computation and data processing with the on-die memory hierarchy for monolithic on-die computing using MTJs including STT-MTJs that can be tailored for the memory and data storage functions in the memory hierarchy, whether in single-level or multi-level MTJ and MTJ back end of line (BEOL) constructions and blocks.

Having a monolithic integrated die in place of a system with one or more boards, a board with one or more modules, or modules with one or more die is desired to reduce Size, Weight, Power and Cost (SWAP-C), while also potentially improving reliability, radiation hardness, throughput, hardware security, modularity, scalability, and power and heat consumption.

In the example of FIG. 1, monolithic die 100 includes cache 104, which may include an MTJ-based MRAM BEOL, such as with STT-MTJs, integrated with Si devices and/or CMOS such as SOI CMOS or bulk CMOS for monolithic on-die processing with hierarchical memory. Single die 100 may include processing circuitry 102, for computation, instruction, and data processing, etc., and may be, for example, implemented in Si/CMOS. Caches 104-108, RAMs 110-114, non-volatile memory 116, and data storage 118 may be defined using MTJs and Si/CMOS. Bit cell configuration and process/memory structure examples may be defined for wafer fabrication process flows, which may plan for a multiplicity of configurations and structure embodiments in the monolithic die, and include a package that includes pin assignments and magnetic shielding embodiments for various package configurations given the use of MTJs such as STT-MTJs of more than one type.

In accordance with the techniques of the disclosure, single die 100 includes, first set of one or more MTJ 104 elements comprising a first anisotropy that results in the first set of one or more magnetic tunnel junction elements being configured to perform a write operation at a first write speed. As used herein anisotropy may refer to the energy or energy density to align the magnetization in a given direction. In this example, single die 100 includes second set of one or more MTJ elements 106 comprising a second anisotropy that results in the second set of one or more MTJ elements being configured to perform a write operation at a second write speed different from the first write speed. Single die 100 includes processing circuitry 102 configured to cache data at first set of one or more MTJ elements 104 for short-term storage and to store data at second set of one or more MTJ elements 106 for long-term storage. For example, the first write speed may be faster than the second write speed and first set of one or more MTJ elements 104 may be configured to hold a magnetization state that is less stable than second set of one or more MTJ elements 106. In some examples, the first write speed is faster than the second write speed and second set of one or more MTJ elements 106 may be configured to hold a magnetization state longer than first set of one or more MTJ elements 104.

Figure 2:
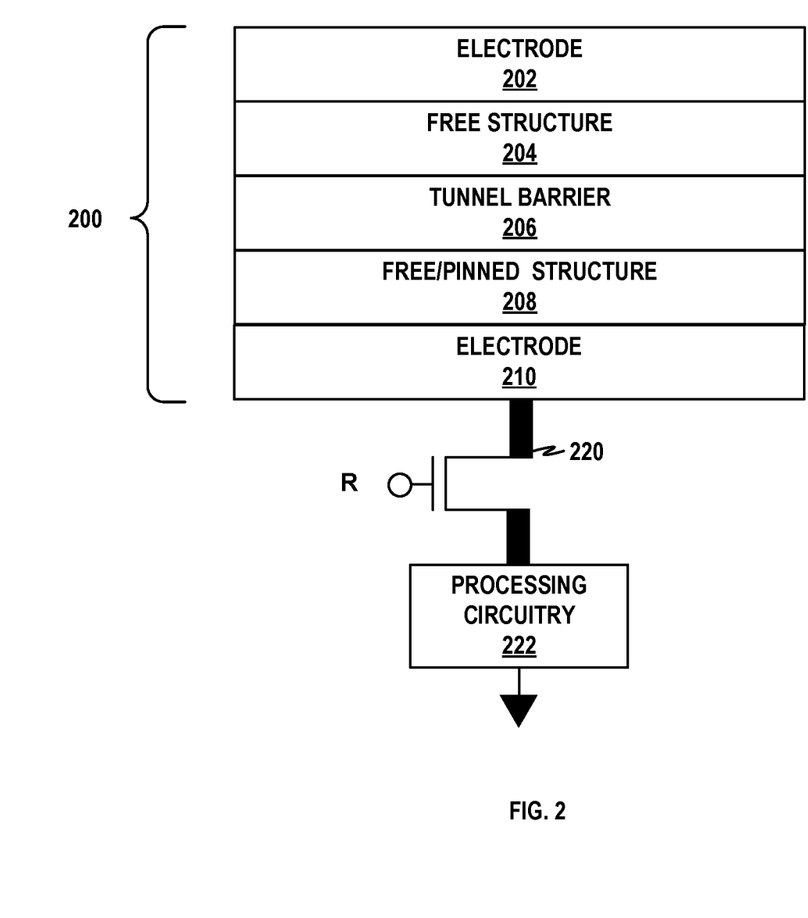
FIG. 2 shows a conceptual illustration of an example of MTJ, in accordance with the techniques of the disclosure.

FIG. 2 shows a conceptual illustration of an example of MTJ 200, in accordance with the techniques of the disclosure. MTJ 200 may be an example of a Magneto-Resistive Random Access Memory (MRAM). Processing circuitry 222 and switching element 220 may represent components of processing circuitry 102 of FIG. 1.

Some applications have been identified in which memory devices, memory components/parts, and architectures may need to be radiation-hardened, offer nonvolatility, and/or include magnetically-based devices that can be integrated monolithically or in multi-chip modules. MRAM is robust, has high endurance, has high data retention performance, and is scalable. These characteristics can be tailored for applications. Magnetic/spintronic memory devices are expected to provide desired non-volatile (and volatile) memory and data storage characteristics; including providing scalability, high endurance, and high data retention performance. These characteristics can be optimized for applications. Magnetic/spintronic memory devices may offer materials and technological similarity and compatibility with MRAM bits and other sensing devices such as accelerometers, gyros, and pressure sensors, which may support integration, modularity, miniaturization, and packaging with embedded MRAM and application specific integrated circuits (ASICs).

Examples of an MRAM may include a STT-MRAMs that use a perpendicularly-oriented MTJ devices as the magnetic data bits and other device structures. A magnetic memory device (e.g., MRAM bit cell and/or MTJ element) may be configured to use spin-dependent diffusion, spin-orbit coupling, and spin transfer to write to a free structure (FL/FL) structure and/or may be configured to use an MTJ element (with tunneling magneto resistive (TMR) sensing, or alternatively, giant magneto-resistive (GMR) sensing or anisotropic magneto-resistive (AMR) sensing) structure for readback.

MTJ element 200 includes free structure 204, tunnel barrier 206, and a free/pinned structure 208. Free structure 204 may include multiple free layers. Free structure 204 may include a magnetization direction that is free to switch between a parallel orientation and an antiparallel orientation. Tunnel barrier 206 includes a non-magnetic metal that separates free structure 204 and free/pinned structure 208. In some examples, tunnel barrier 206 may be formed of aluminum oxide, magnesium oxide, or another material. Free/pinned structure 208 may be a pinned structure that includes a magnetization direction that is fixed or "pinned" to a single orientation. For example, free/pinned structure 208 may be pinned in a parallel orientation. In other examples, free/pinned structure 208 may be pinned in an antiparallel orientation. In the example of FIG. 2, free/pinned structure 208 may include an anti-ferromagnetic layer, such that the magnetization direction of the pinned structure is "pinned" in a particular orientation the magnetization direction of the pinned structure remains relatively fixed when operational magnetic fields are applied to MTJ element 200. In some examples, free/pinned structure 208 may include a magnetization direction that is free to switch between a parallel orientation and an antiparallel orientation.

Electrodes 202, 210 may be formed of a conductive material to permit a connection to MTJ element 420. Examples of conductive materials may include, but are not limited to, copper. As shown, in this example, tunnel barrier 206 may be arranged below free structure 204. A geometry of tunnel barrier 206 may be optimized for read endurance without being subject to the write process. MTJ 200 may be implemented in single die 100 by, for example, placing MTJ 200 in a bit cell of single die 100 and/or integrating the bit cell into one or more memory circuits.

Figure 3A:
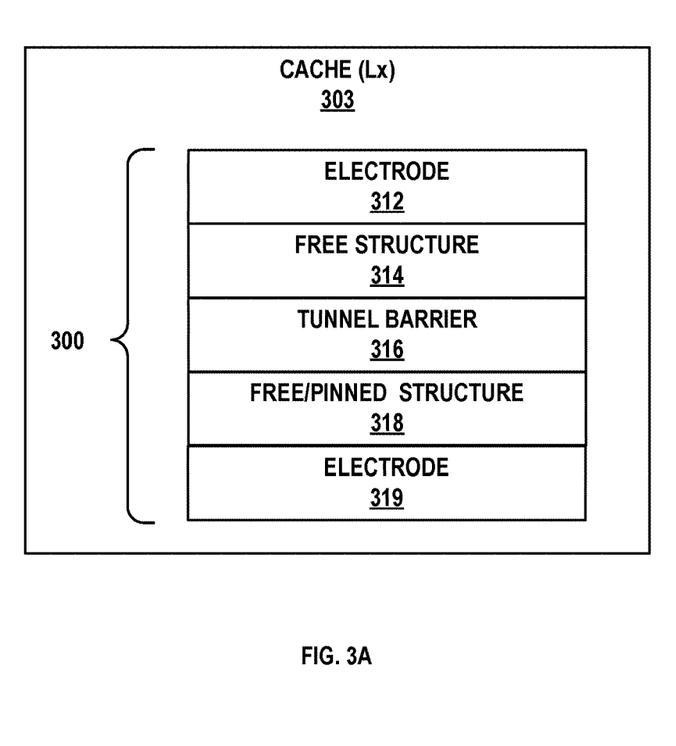
FIG. 3A shows a conceptual illustration of a first set of one or more MTJs, in accordance with the techniques of the disclosure.
Figure 3B:
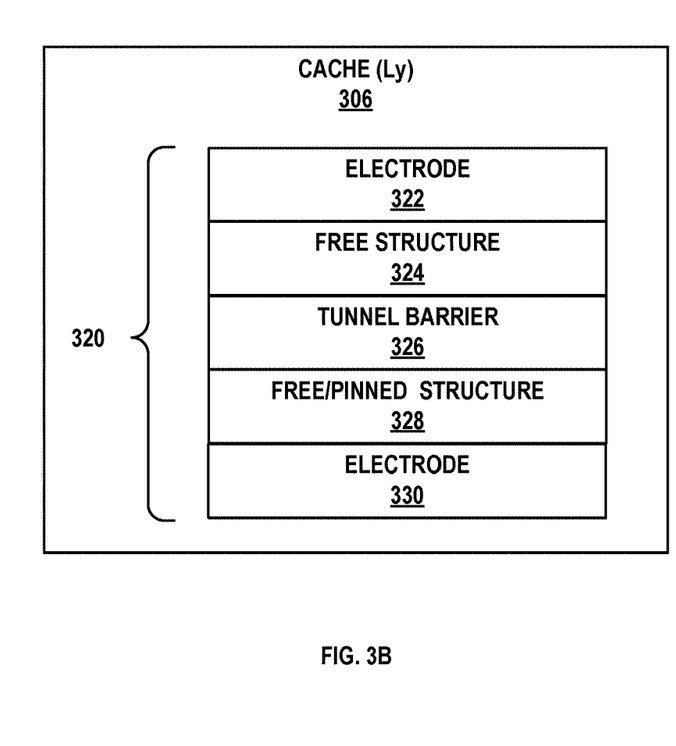
FIG. 3B shows a conceptual illustration of a second set of one or more MTJs different from the first set of one or more MTJs of FIG. 3A, in accordance with the techniques of the disclosure.

FIG. 3A shows a conceptual illustration of a first set of one or more MTJs 304 (also referred to herein as cache (Lx) 304), in accordance with the techniques of the disclosure. FIG. 3B shows a conceptual illustration of a second set of one or more MTJs 306 (also referred to herein as cache (Ly) 306) different from the first set of one or more MTJs 304 of FIG. 3A, in accordance with the techniques of the disclosure.

FIGS. 3A and 3B represent two sets of MTJ devices with modified materials and/or compositions between the two sets of MTJ devices to vary and trade-off switching and data retention times. In the example of FIG. 3A, first set of one or more MTJs 304 includes a first MTJ 300 that includes an electrode 312, free structure 314, tunnel barrier 316, free/pinned structure 318, and electrode 319. Second set of one or more MTJs 306 includes a second MTJ 320 that includes an electrode 322, free structure 324, tunnel barrier 326, free/pinned structure 328, and electrode 330.

For example, first set of one or more MTJs 304 and second set of one or more MTJs 306 can have varied anisotropy (Ku) and/or the magnetic volume to vary the switching and/or data retention times such as to vary the energy barrier (Eb). In some examples, first set of one or more MTJs 304 and second set of one or more MTJs 306 can vary the anisotropy via material deposition techniques, device treatments, and modifying and/or varying the interfaces, number of interfaces, and/or the material(s) within each layer.

Material deposition approaches may include, e.g., for the FL: Sputtering (DC, RF, etc.), CVD, or PVD (Chemical or Plasma Vapor Deposition) for the material within the layer as well as for controlling the interface(s) such as between the FL, FL structures, and TB.

TABLE 1

Comparison of First and second set of MTJ devices

| First set of MTJ devices | Second set of MTJ devices |
|---|---|
| Switching time $t_{s1}$ | Switching time $t_{s2}$ |
| Data retention time $t_{dr1}$ | Data retention time $t_{dr2}$ |
| Energy barrier $E_{b1}$ | Energy barrier $E_{b2}$ |
| Anisotropy $K_{u1}$ | Anisotropy $K_{u2}$ |
| FL thickness $t_{FL1}$ | FL thickness $t_{FL2}$ |
| FL area $A_{FL1}$ | FL area $A_{FL2}$ |

TABLE 2

Example Materials of layers

| MTJ Layer Structures | Materials |
|---|---|
| TE: Top Electrode | Tungsten (W), gold (Au), Titanium (Ti), and/or Tantalum (Ta) |
| FL: Free Layer | a nickel-iron alloy (NiFe), Cobalt Iron Boron (CoFeB), iron boride (FeB), iron carbonate (FeCo), NiFeCo, Carbonyl platinum (CoPt), iron (Fe), and/or Ruthenium (Ru) |
| TB: Tunnel Barrier | Aluminum oxide (AlOx) and/or Magnesium oxide (MGO) |
| PL: Pinned Layer | Iron manganese (FeMn) and/or Iridium—manganese (IrMn) |
| BE: Bottom Electrode | Tungsten (W), gold (Au), Titanium (Ti), and/or Tantalum (Ta) |

In accordance with the techniques of the disclosure, first set of MTJ elements 304 may include a first set of materials and second set of MTJ elements 306 may include a second set of materials different from the first set of materials. For instance, first set of MTJ elements 304 may include NiFeCo in the free layer and second set of MTJ elements 306 may include further CoFeB without NiFeCo.

First set of MTJ elements 304 may include a first anisotropy based on a first material deposition technique used to generate a first MTJ element of first set of MTJ elements 304. Second set of MTJ elements 306 may include a second anisotropy based on a second material deposition technique used to generate the second MTJ element of the second set of MTJ elements 306. The first material deposition technique comprises forming a free layer of the first MTJ element using a first combination of one or more of sputter, chemical vapor deposition, or plasma vapor deposition. Similarly, the second material deposition technique comprises forming a free layer of the second MTJ element using a second combination of one or more of sputter, chemical vapor deposition, or plasma vapor deposition that is different from the first combination. For instance, first MTJ element of first set of MTJ elements 304 may include a layer (e.g., free layer, tunnel barrier, or pinned layer) that comprises a CVD deposit of material. For this instance, second MTJ element of second set of MTJ elements 306 may include a layer (e.g., free layer, tunnel barrier, or pinned layer) that comprises a PVD deposit of material.

First set of MTJ elements 304 may include a first anisotropy based on a first material deposition technique used to generate a first interface between a tunnel barrier of a first MTJ element of the first set of MTJ elements and a first layer of the first MTJ element. As used herein, an interface may refer to a surface of a material, whether as a boundary of a single material layer or as a boundary of a material within a multilayer structure or device, and such as a deposited material and/or a deposited material subject to additional processing, such as a free layer, a pinned layer, or a tunnel barrier. The first layer may include a free layer or a pinned layer. In this example, second set of MTJ elements 306 include a second anisotropy based on a second material deposition technique used to generate a second interface between a tunnel barrier of a second MTJ element of the second set of MTJ elements and a second layer of the second MTJ element. The second layer includes a free layer or a pinned layer. For example, the first material deposition technique comprises forming the first interface using a first combination of one or more of sputter, chemical vapor deposition, or plasma vapor deposition; and the second material deposition technique comprises forming the second interface using a second combination of one or more of sputter, chemical vapor deposition, or plasma vapor deposition that is different from the first combination.

Figure 4A:
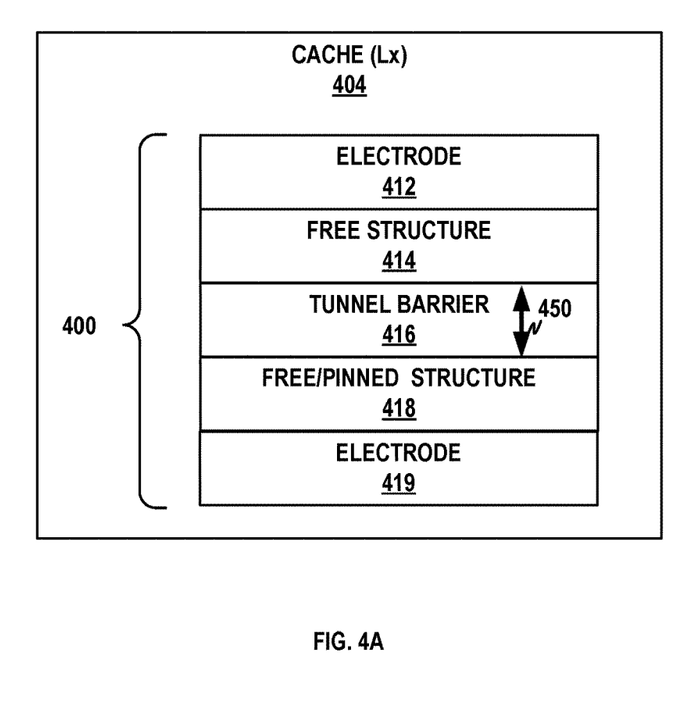
FIG. 4A shows a conceptual illustration of a first set of one or more MTJs, in accordance with the techniques of the disclosure.
Figure 4B:
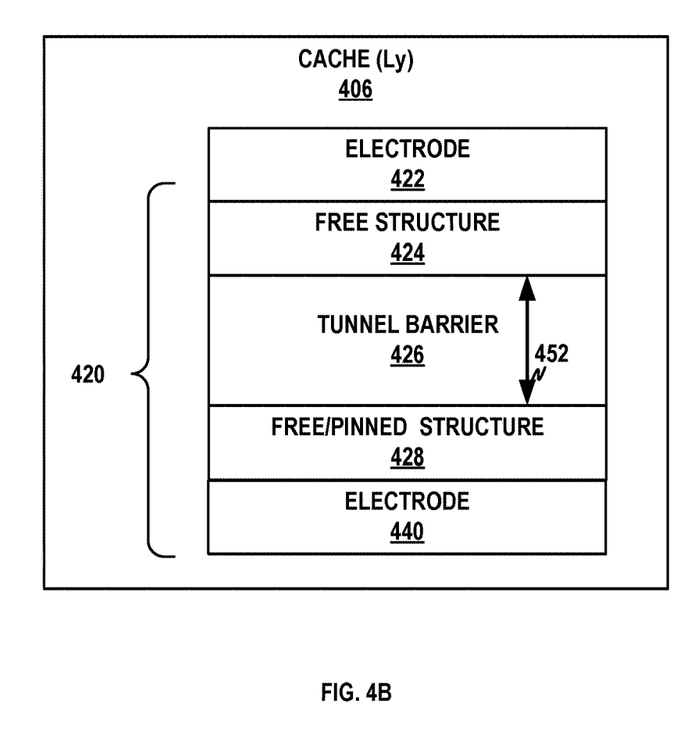
FIG. 4B shows a conceptual illustration of a second set of one or more MTJs different from the first set of one or more MTJs of FIG. 4A, in accordance with the techniques of the disclosure.

FIG. 4A shows a conceptual illustration of a first set of one or more MTJs 404, in accordance with the techniques of the disclosure. FIG. 4B shows a conceptual illustration of a second set of one or more MTJs 406 different from first set of one or more MTJs 404 of FIG. 4A, in accordance with the techniques of the disclosure. In the example of FIG. 4A, first set of one or more MTJs 404 includes a first MTJ element 400 that includes an electrode 412, free structure 414, tunnel barrier 416, free/pinned structure 418, and electrode 419. Second set of one or more MTJs 406 includes a second MTJ element 420 that includes an electrode 422, free structure 424, tunnel barrier 426, free/pinned structure 428, and electrode 440.

In the example of FIGS. 4A, 4B, first set of one or more MTJs 404 and second set of one or more MTJs 406 have different materials and/or compositions between the two sets of MTJ devices to vary and trade-off switching and data retention times. For example, first set of one or more MTJs 404 and second set of one or more MTJs 406 may have different anisotropy (Ku)/or the magnetic volume as discussed above.

TABLE 3

Comparison of First and second set of MTJ devices

| First set of MTJ devices | Second set of MTJ devices |
|---|---|
| Switching time $t_{s1}$ | Switching time $t_{s2}$ |
| Data retention time $t_{dr1}$ | Data retention time $t_{dr2}$ |
| Energy barrier $E_{b1}$ | Energy barrier $E_{b2}$ |
| Anisotropy $K_{u1}$ | Anisotropy $K_{u2}$ |
| FL thickness $t_{FL1}$ | FL thickness $t_{FL2}$ |
| FL area $A_{FL1}$ | FL area $A_{FL2}$ |

For example, first set of MTJ elements 404 may include the first anisotropy based on a first volume of a free layer (e.g., free structure 404 or free/pinned structure 408) of first MTJ element 400 of first set of MTJ elements 404. Second set of MTJ elements 406 may include the second anisotropy based on a second volume of a free layer (e.g., free structure 424 or free/pinned structure 428) of a second MTJ element 420 of second set of MTJ elements 406. The second volume may be different from the first volume. For example, first set of MTJ elements 406 may include the first anisotropy based on a first thickness 450 of a tunnel barrier 406 of a first MTJ element 400 of the first set of MTJ elements 404. Second set of MTJ elements 406 may include the second anisotropy based on a second thickness 452 of a tunnel barrier 426 of a second MTJ element 420 of second set of MTJ elements 406. The second thickness may be different from the first thickness.

Figure 5A:
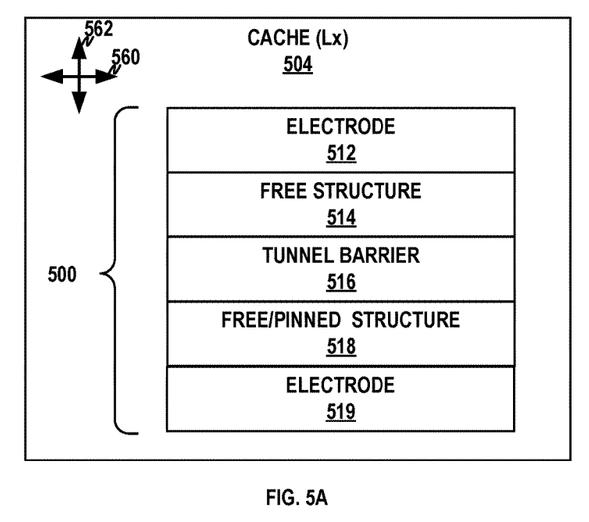
FIG. 5A shows a conceptual illustration of a first set of one or more MTJs in a first view, in accordance with the techniques of the disclosure.
Figure 5B:
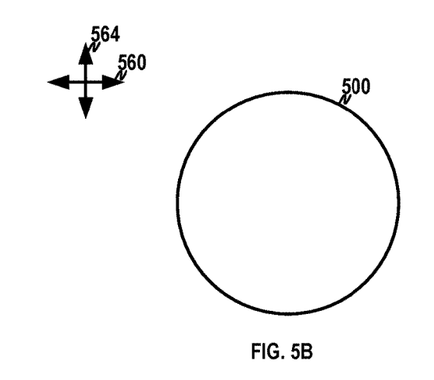
FIG. 5B shows a conceptual illustration of the first set of one or more MTJs of FIG. 5A in a second view, in accordance with the techniques of the disclosure.

FIG. 5A shows a conceptual illustration of a first set of one or more MTJs 504 in a first view, in accordance with the techniques of the disclosure. FIG. 5A illustrates first MTJ element 500 along a first axis 560 and a second axis 562. FIG. 5B shows a conceptual illustration of the first set of one or more MTJs of FIG. 5A in a second view, in accordance with the techniques of the disclosure. FIG. 5B illustrates first MTJ element 500 along first axis 560 and a third axis 564. The first axis 560, the second axis 562, and the third axis 564 being perpendicular. In the example of FIG. 5A, first set of one or more MTJs 504 includes a first MTJ element 500 that includes an electrode 512, free structure 514, tunnel barrier 516, free/pinned structure 518, and electrode 519.

Figure 6A:
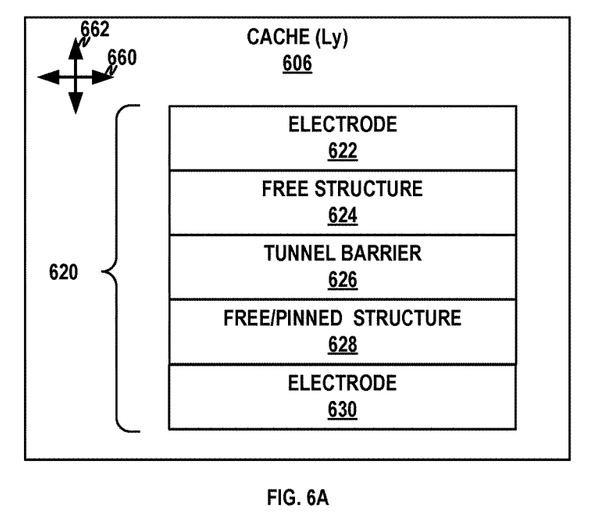
FIG. 6A shows a conceptual illustration of a second set of one or more MTJs in a first view, in accordance with the techniques of the disclosure.
Figure 6B:
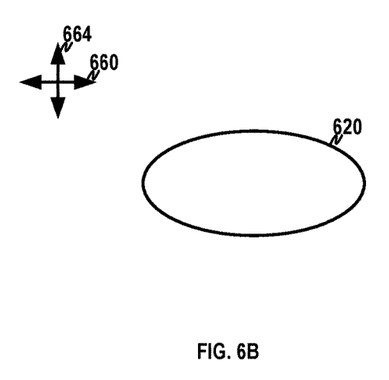
FIG. 6B shows a conceptual illustration of the second set of one or more MTJs of FIG. 6A in a second view, in accordance with the techniques of the disclosure.

FIG. 6A shows a conceptual illustration of a second set of one or more MTJs 606 in a first view, in accordance with the techniques of the disclosure. FIG. 6A illustrates second MTJ element 620 along a first axis 660 and a second axis 662. FIG. 6B shows a conceptual illustration of second set of one or more MTJs 606 of FIG. 6A in a second view, in accordance with the techniques of the disclosure. FIG. 6B illustrates second MTJ element 620 along first axis 660 and a third axis 664. The first axis 660, the second axis 662, and the third axis 664 being perpendicular. Second set of one or more MTJs 606 includes a second MTJ element 620 that includes an electrode 622, free structure 624, tunnel barrier 626, free/pinned structure 628, and electrode 630.

First set of MTJ elements 504 may include a first anisotropy based on a first shape of a free layer of first MTJ element 500 of first set of MTJ elements 504. Second set of MTJ elements 606 include a second anisotropy based on a second shape of a free layer of second MTJ element 620 of second set of MTJ elements 606. The second shape may be different from the first shape. For example, first MTJ element 500 comprises a circle shape and second MTJ element 620 comprises an oval shape. Examples of shapes are illustrated in FIG. 7.

Figure 7:
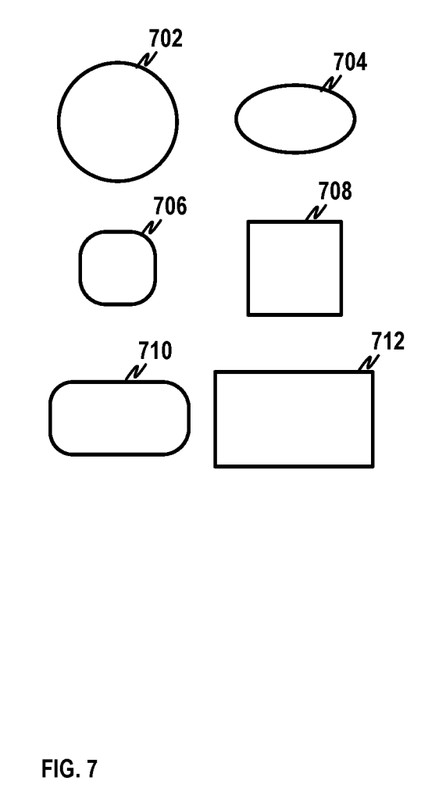
FIG. 7 shows a conceptual illustration of example shapes for a MTJ, in accordance with the techniques of the disclosure.

FIG. 7 shows a conceptual illustration of example shapes for an MTJ, in accordance with the techniques of the disclosure. For example, an MTJ may include a shape that is a circle 702, an oval 704, a square 708, a square with rounded corners 706, a rectangle 712, or a rectangle with rounded corners 710.

Figure 8:
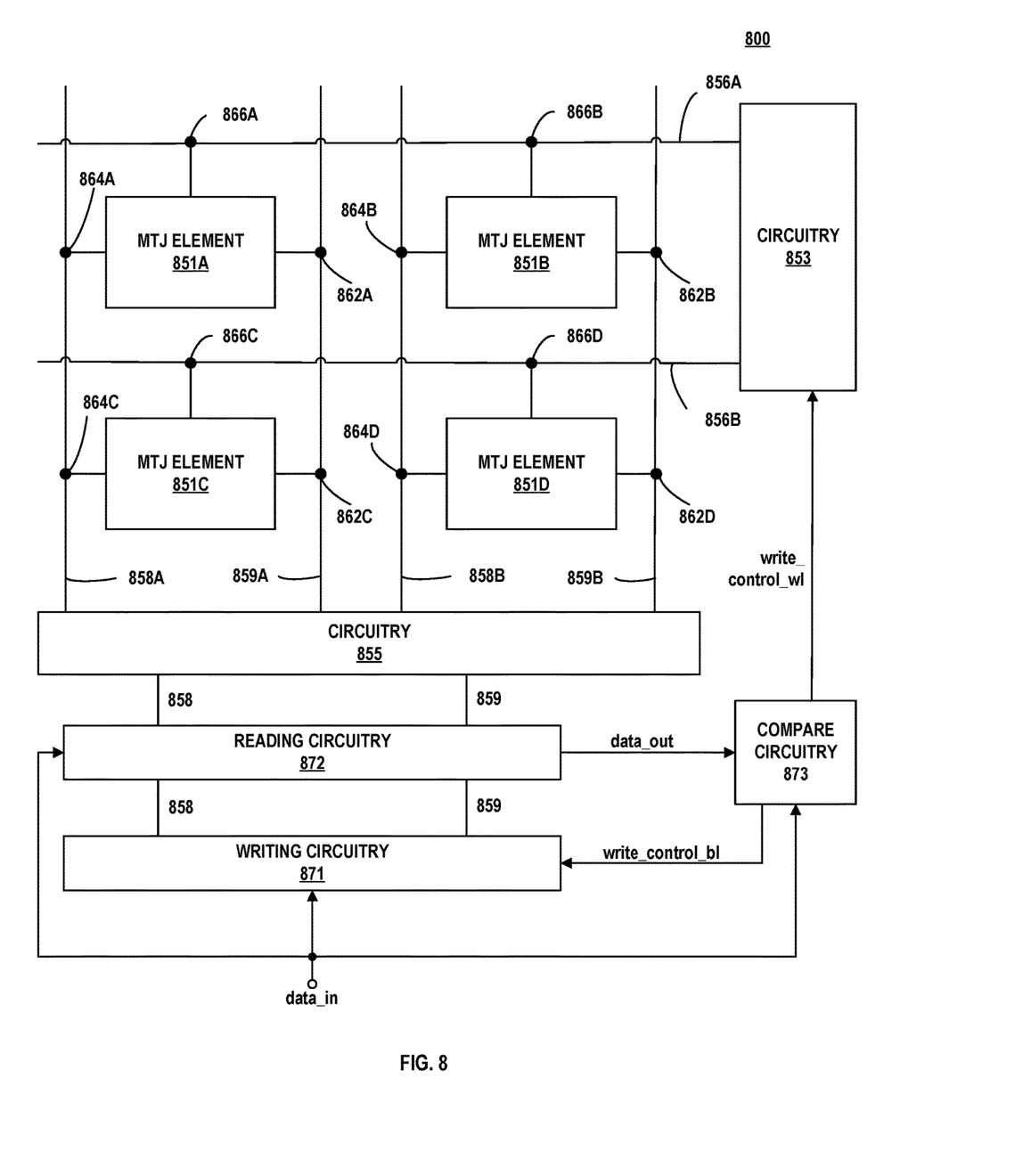
FIG. 8 shows a diagram of a magnetic device that may be used to implement the techniques of the present disclosure, in accordance with the techniques of the disclosure.

FIG. 8 shows a diagram of a magnetic device 800 that may be used to implement the techniques of the present disclosure, in accordance with the techniques of the disclosure. Memory devices implementing one or more of the techniques described in this disclosure may be implemented in a wide array of electronic devices ranging from small portable devices such as music players, smart phones, game cartridges, and memory sticks up to larger devices such as tablet computers, gaming devices or consoles, desktop computers, super computers, and enterprise storage solutions. Processing circuitry may include circuitry 855, reading circuitry 872, writing circuitry 871, compare circuitry 873, and circuitry 853. While the following example refers to an example using MTJ elements, techniques described herein may apply to any magnetic device. For example, techniques described herein may be applied to MRAM, such as, for example, STT-MRAMs.

Bitline 858A connects to MTJ element 851A ("MTJ element") at node 864A and connects to MTJ element 851C at node 864C. Bitline 858B connects to MTJ element 851B at node 864B and connects to MTJ element 851D at node 864D. Although, not explicitly shown in FIG. 8, each of nodes 864A-864D may correspond to a source or drain terminal of an access MOSFET for a respective MTJ element.

Bitline 859A connects to MTJ element 851A at node 862A and connects to MTJ element 851C at node 862C. Bitline 859B connects to MTJ element 851B at node 862B and connects to MTJ element 851D at node 862D. Although, not explicitly shown in FIG. 8, each of nodes 862A-862D may correspond to a source or drain terminal of an access MOSFET of a respective MTJ element. For example, node 864A may correspond to a source or drain terminal of an access MOSFET for MTJ element 851A and node 862A may correspond to a source or drain terminal of an access MOSFET for MTJ element 851A.

By controlling the voltages applied to wordline 856A, wordline 856B, bitline 858A, bitline 858B, bitline 859A, and bitline 859B, an individual MTJ element can be addressed. For example, suppose that a write operation is being performed on MTJ element 851A. Circuitry 853 may apply an access MOSFET turn-on voltage to wordline 856A and a turn-off voltage to wordline 856B, and circuitry 855 may pass a high voltage to bitline 859A but not to bitline 859B. In this case, the turn-on voltage applied to wordline 856A causes node 866A (connected to a gate of an access MOSFET, not shown in FIG. 8) to receive a turn-on voltage. The high voltage applied to bitline 859A causes node 862A (connected to a source or drain of an access MOSFET, not shown in FIG. 8) to receive a high voltage, and a source voltage applied to bitline 858A causes node 864A (connected to a source or drain of an access MOSFET) to receive a source voltage. As described above, the high voltage applied to node 866A causes current to flow through an access MOSFET, resulting in current through MTJ element 851A. Thus, the resistance and/or magnetoresistance of MTJ element 851A can be changed. Examples of resistance and/or magnetoresistance may include, but are not limited to, tunnel magnetoresistance (TMR), giant magnetoresistance (GMR), anisotropic magnetoresistive (ARM), and other resistance and/or magnetoresistance.

While this write operation is occurring at MTJ element 851A, MTJ elements 851B, 851C, and 851D may remain unchanged. Although the high voltage applied to wordline 856A can cause a high voltage at node 866B (connected to a gate of an access MOSFET for MTJ element 851B), circuitry 855 may not apply a high voltage to either bitline 858B or bitline 859B. In this case, with no high voltage drop across an access MOSFET for MTJ element 851B, the state of MTJ element 851B does not change.

Similarly, while this write operation is occurring at MTJ element 851A, the high voltage applied to bitline 859A causes a high voltage at node 862C, and the source voltage applied to bitline 858A causes a source voltage at node 864C. Circuitry 853, however, applies a turn-off voltage to wordline 856B. Thus, the access MOSFET of MTJ element 851C does not conduct current, and thus it is intended that this prevents current at MTJ element 851C. Without a current flow, the resistance of MTJ element 851C does not change, and the state of MTJ element 851C does not change. Accordingly, by controlling the voltages applied to wordline 856A, wordline 856B, bitline 858A, bitline 858B, bitline 859A, and bitline 859B, in the manner described above, MTJ elements 851A, 851B, 851C, and 851D can be individually written to without altering the state of MTJ elements that are connected to a common wordline or common bitline.

Writing circuitry 871 receives data input (e.g., '0' or '1'), which represents a state of two states. Depending on the data state to be written, writing circuitry 871 defines the appropriate voltage to be applied to the bitlines. As discussed above, circuitry 855 controls the passing of the voltages from writing circuitry 871 output bitline 858 and bitline 859 to the various bitlines so that the write operation is applied to the correct MTJ element within the array of MTJ elements.

Reading circuitry 872 is configured to monitor the resistance and/or magnetoresistance of a given MTJ element, which may correspond to a spin-dependent diffusion, spin-orbit coupling, and spin transfer of the given MTJ element, while the given MTJ element is undergoing a write operation. This monitoring of the resistance and/or magnetoresistance is termed Rmonitor, which represents the real time measuring of the MTJ element resistance and/or magnetoresistance during the write operation. Reading circuitry 872 uses the write "0" or "1" states defined on data_in to determine which monitoring state and Rwrite_ref to set up.

Compare circuitry 873 compares the "0" or "1" data state of the selected MTJ element of MTJ elements 851A-851D, as determined by reading circuitry 872 and defined on node data_out, to the "0" or "1" data state as defined on node data_in and issues a write terminate instruction on the write_control_b1 and write_control_w1 lines upon determining that the data states on data_in and data_out match.

When circuitry 873 issues a write terminate command on write_control_b1 to writing circuitry 871, writing circuitry 871 terminates the application of the high voltage on bitline 858 or bitline 859 which causes the high voltage across the selected MTJ element to collapse and, thus, stop the resistance and/or magnetoresistance changing and stop modifying spin-dependent diffusion, spin-orbit coupling, and spin transfer of the MTJ element. When circuitry 873 issues a write terminate command on write_control_w1 to circuitry 853, circuitry 853 changes the turned-on wordline to turned-off which causes the selected MTJ element to collapse and, thus, stop the resistance and/or magnetoresistance changing in the MTJ element.

In accordance with one or more techniques described herein, writing circuitry 871 is configured to receive an instruction to set an MTJ element to a target state of a plurality of states. For example, writing circuitry 871 may be configured to receive an instruction to set MTJ element 851A to a state '1'. In response to receiving the instruction, writing circuitry 871 may be configured to generate electrical current to modify a resistance of the MTJ element to correspond to the target state. For example, writing circuitry 871 may be configured to define the appropriate voltage to be applied to the bitlines. In this example, circuitry 855 controls the passing of voltages from writing circuitry 871 output bitline 858 and bitline 859 to the various bitlines such that the write operation is applied to the correct MTJ element within the array of MTJ elements. For instance, writing circuitry 871 generates electrical current through MTJ element 851 to set MTJ element 851 to a state '1'.

Figure 9:
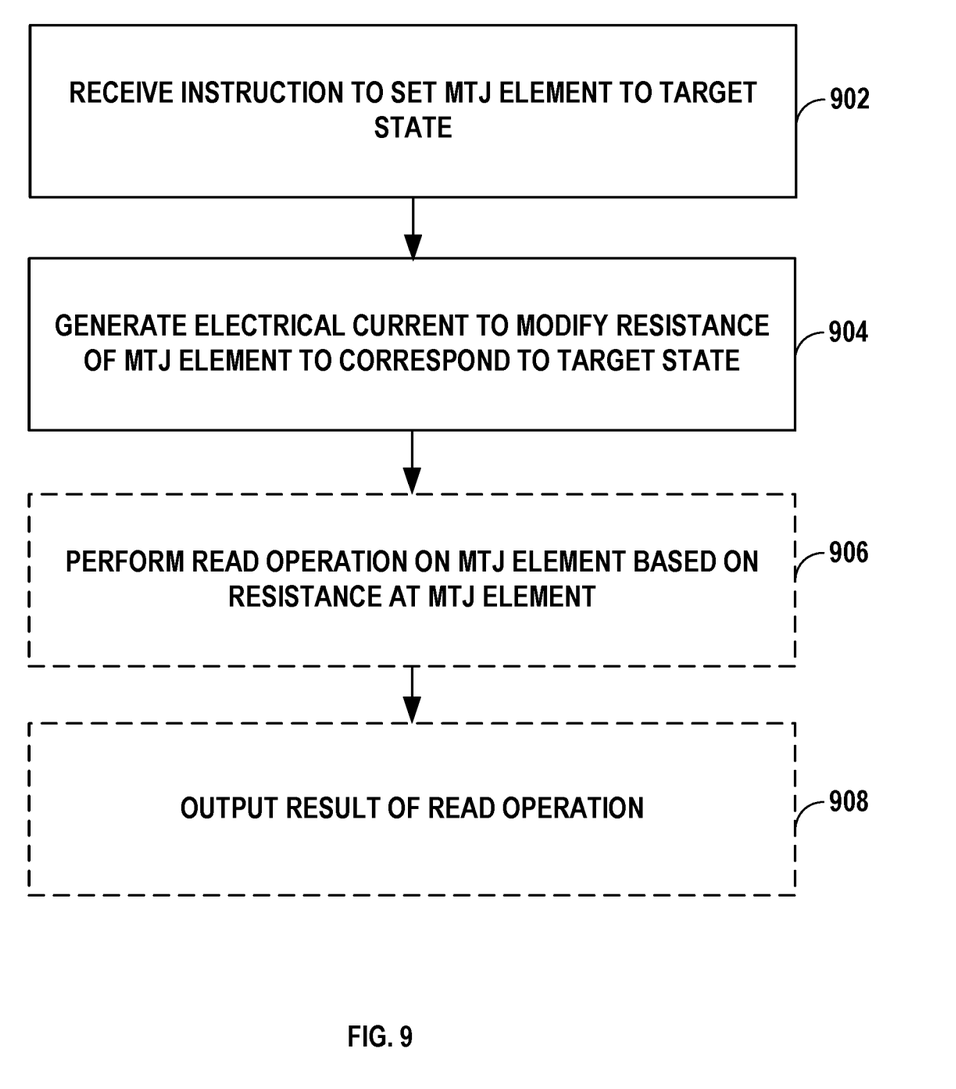
FIG. 9 shows a flowchart of a process for performing a write operation, in accordance with the techniques of this disclosure.

FIG. 9 shows a flowchart of a process for performing a write operation, in accordance with the techniques of this disclosure. The techniques of FIG. 9 may, for example, be performed by magnetic device described above with respect to any combination of FIGS. 1-9. While the following example refers to an example using MTJ elements, techniques described herein may apply to any magnetic device. For example, techniques described herein may be applied to MRAM, such as, for example, STT-MRAMs.

Processing circuitry receives an instruction to set a MTJ element of a magnetic device to a target state of a plurality of states (902). For example, processing circuitry receives an instruction to set a MTJ element to a high logical value "1." The processing circuitry may generate electrical current to modify a resistance of the MTJ element to correspond to the target state (904). For example, the processing circuitry may generate electrical current to modify a spin-dependent diffusion, spin-orbit coupling, and spin transfer of MTJ element 124 to a resistance that corresponds to the high logical value "1."

The processing circuitry may optionally perform a read operation on MTJ element based on a resistance at MTJ element (906). For example, the processing circuitry may determines the MTJ element has a state of the high logical value "1" when a resistance of the MTJ element corresponds to the high logical value "1." The processing circuitry may optionally output an indication of the read operation (908). For example, the processing circuitry may output a high logical value "1" in response to the read operation on the MTJ element.

The following numbered clauses may demonstrate one or more aspects of the disclosure.

Clause 1. An apparatus comprising a single die, the single die including: a first set of one or more MTJ elements comprising a first anisotropy that results in the first set of one or more magnetic tunnel junction elements being configured to perform a write operation at a first write speed; a second set of one or more MTJ elements comprising a second anisotropy that results in the second set of one or more MTJ elements being configured to perform a write operation at a second write speed different from the first write speed; and processing circuitry configured to cache data at the first set of one or more MTJ elements for short-term storage and to store data at the second set of one or more MTJ elements for long-term storage.

Clause 2. The apparatus of clause 1, wherein an MTJ element of the first set of MTJ elements comprises a free structure, a pinned structure, and a tunnel barrier arranged between the free structure and the pinned structure.

Clause 3. The apparatus of clauses 1-2, wherein the first set of MTJ elements comprise a first set of materials and the second set of MTJ elements comprise a second set of materials different from the first set of materials.

Clause 4. The apparatus of clauses 1-3, wherein the first set of MTJ elements comprises the first anisotropy based on a first material deposition technique used to generate the first MTJ element of the first set of MTJ elements; and wherein the second set of MTJ elements comprises the second anisotropy based on a second material deposition technique used to generate the second MTJ element of the second set of MTJ elements.

Clause 5. The apparatus of clause 4, wherein the first material deposition technique comprises forming a free layer of the first MTJ element using a first combination of one or more of sputter, chemical vapor deposition, or plasma vapor deposition; and wherein the second material deposition technique comprises forming a free layer of the second MTJ element using a second combination of one or more of sputter, chemical vapor deposition, or plasma vapor deposition that is different from the first combination.

Clause 6. The apparatus of clauses 1-5, wherein the first set of MTJ elements comprises the first anisotropy based on a first material deposition technique used to generate a first interface between a tunnel barrier of a first MTJ element of the first set of MTJ elements and a first layer of the first MTJ element, the first layer comprising a free layer or a pinned layer; and wherein the second set of MTJ elements comprises the second anisotropy based on a second material deposition technique used to generate a second interface between a tunnel barrier of a second MTJ element of the second set of MTJ elements and a second layer of the second MTJ element, the second layer comprising a free layer or a pinned layer.

Clause 7. The apparatus of clause 6, wherein the first material deposition technique comprises forming the first interface using a first combination of one or more of sputter, chemical vapor deposition, or plasma vapor deposition; and wherein the second material deposition technique comprises forming the second interface using a second combination of one or more of sputter, chemical vapor deposition, or plasma vapor deposition that is different from the first combination.

Clause 8. The apparatus of clauses 1-7, wherein the first set of MTJ elements comprises the first anisotropy based on a first volume of a free layer of a first MTJ element of the first set of MTJ elements; and wherein the second set of MTJ elements comprises the second anisotropy based on a second volume of a free layer of a second MTJ element of the second set of MTJ elements, the second volume being different from the first volume.

Clause 9. The apparatus of clauses 1-8, wherein the first set of MTJ elements comprises the first anisotropy based on a first thickness of a tunnel barrier of a first MTJ element of the first set of MTJ elements; and wherein the second set of MTJ elements comprises the second anisotropy based on a second thickness of a tunnel barrier of a second MTJ element of the second set of MTJ elements, the second thickness being different from the first thickness.

Clause 10. The apparatus of clauses 1-9, wherein the first set of MTJ elements comprises the first anisotropy based on a first shape of a free layer of a first MTJ element of the first set of MTJ elements; and wherein the second set of MTJ elements comprises the second anisotropy based on a second shape of a free layer of a second MTJ element of the second set of MTJ elements, the second shape being different from the first shape.

Clause 11. The apparatus of clause 10, wherein the first shape comprises a circle, an oval, a square, a square with rounded corners, a rectangle, or a rectangle with rounded corners.

Clause 12. The apparatus of clauses 1-11, wherein the first write speed is faster than the second write speed; and wherein the first set of one or more MTJ elements is configured to hold a magnetization state that is less stable than the second set of one or more MTJ elements.

Clause 13. The apparatus of clauses 1-12, wherein the first write speed is faster than the second write speed; and wherein the second set of one or more MTJ elements is configured to hold a magnetization state longer than the first set of one or more MTJ elements.

Clause 14. A single die comprising: a first set of one or more MTJ elements comprising a first anisotropy that results in the first set of one or more magnetic tunnel junction elements being configured to perform a write operation at a first write speed; a second set of one or more MTJ elements comprising a second anisotropy that results in the second set of one or more MTJ elements being configured to perform a write operation at a second write speed different from the first write speed; and processing circuitry configured to cache data at the first set of one or more MTJ elements for short-term storage and to store data at the second set of one or more MTJ elements for long-term storage.

Clause 15. The single die of clause 14, wherein an MTJ element of the first set of MTJ elements comprises a free structure, a pinned structure, and a tunnel barrier arranged between the free structure and the pinned structure.

Clause 16. The single die of clauses 14-15, wherein the first set of MTJ elements comprise a first set of materials and the second set of MTJ elements comprise a second set of materials different from the first set of materials.

Clause 17. The single die of clauses 14-16, wherein the first set of MTJ elements comprises the first anisotropy based on a first material deposition technique used to generate the first MTJ element of the first set of MTJ elements; and wherein the second set of MTJ elements comprises the second anisotropy based on a second material deposition technique used to generate the second MTJ element of the first set of MTJ elements.

Clause 18. The single die of clause 17, wherein the first material deposition technique comprises forming a free layer of the first MTJ element using a first combination of one or more of sputter, chemical vapor deposition, or plasma vapor deposition; and wherein the second material deposition technique comprises forming a free layer of the second MTJ element using a second combination of one or more of sputter, chemical vapor deposition, or plasma vapor deposition that is different from the first combination.

Clause 19. The single die of clauses 14-18, wherein the first set of MTJ elements comprises the first anisotropy based on a first material deposition technique used to generate a first interface between a tunnel barrier of a first MTJ element of the first set of MTJ elements and a first layer of the first MTJ element, the first layer comprising a free layer or a pinned layer; and wherein the second set of MTJ elements comprises the second anisotropy based on a second material deposition technique used to generate a second interface between a tunnel barrier of a second MTJ element of the second set of MTJ elements and a second layer of the second MTJ element, the second layer comprising a free layer or a pinned layer.

Clause 20. The single die of clause 19, wherein the first material deposition technique comprises forming the first interface using a first combination of one or more of sputter, chemical vapor deposition, or plasma vapor deposition; and wherein the second material deposition technique comprises forming the second interface using a second combination of one or more of sputter, chemical vapor deposition, or plasma vapor deposition that is different from the first combination.

The processing circuitry may include metallization and/or integrated circuitry (e.g., Complementary metal-oxide-semiconductor (CMOS)). The processing circuitry may include an analog circuit. In some examples, the processing circuitry may include a microcontroller on a single integrated circuit containing a processor core, memory, inputs, and outputs. For example, the processing circuitry may include one or more processors, including one or more microprocessors, Digital Signal Processors (DSPs), ASICS, Field Programmable Gate Arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, processing circuitry may include a combination of one or more analog components and one or more digital components.

The term "circuitry" as used herein may refer to any of the foregoing structure or any other structure suitable for processing program code and/or data or otherwise implementing the techniques described herein. Circuitry may, for example, include any of a variety of types of solid state circuit elements, such as CPUs, CPU cores, GPUs, DSPs, ASICs, mixed-signal integrated circuits, FPGAs, microcontrollers, programmable logic controllers (PLCs), programmable logic device (PLDs), complex PLDs (CPLDs), systems on a chip (SoC), any subsection of any of the above, an interconnected or distributed combination of any of the above, or any other integrated or discrete logic circuitry, or any other type of component or one or more components capable of being configured in accordance with any of the examples disclosed herein.

As used in this disclosure, circuitry may also include one or more memory devices, such as any volatile or non-volatile media, such as a RAM, ROM, non-volatile RAM (NVRAM), electrically erasable programmable ROM (EEPROM), flash memory, and the like. The one or more memory devices may store computer-readable instructions that, when executed or processed the circuitry, cause the circuitry to implement the techniques attributed herein to circuitry. The circuitry of this disclosure may be programmed, or otherwise controlled, with various forms of firmware and/or software.

Various illustrative aspects of the disclosure have been described above. These and other aspects are within the scope of the following claims.

The invention claimed is:

1. An apparatus comprising a single die, the single die including:
   a first set of one or more magnetic tunnel junction (MTJ) elements comprising a first anisotropy based on a first shape of a free layer of a first MTJ element of the first set of one or more MTJ elements that results in the first set of one or more MTJ elements being configured to perform a first write operation at a first write speed;
   a second set of one or more MTJ elements comprising a second anisotropy based on a second shape of a free layer of a second MTJ element of the second set of one or more MTJ elements that results in the second set of one or more MTJ elements being configured to perform a second write operation at a second write speed different from the first write speed, wherein the second shape is different from the first shape; and
   processing circuitry configured to cache data at the first set of one or more MTJ elements for short-term storage and to store data at the second set of one or more MTJ elements for long-term storage.

2. The apparatus of claim 1, wherein an MTJ element of the first set of MTJ elements comprises a free structure, a pinned structure, and a tunnel barrier arranged between the free structure and the pinned structure.

3. The apparatus of claim 1, wherein the first set of MTJ elements comprise a first set of materials and the second set of MTJ elements comprise a second set of materials different from the first set of materials.

4. The apparatus of claim 1,
   wherein the first set of MTJ elements comprises the first anisotropy further based on a first material deposition technique used to generate the first MTJ element of the first set of MTJ elements; and
   wherein the second set of MTJ elements comprises the second anisotropy further based on a second material deposition technique used to generate the second MTJ element of the second set of MTJ elements.

5. The apparatus of claim 4,
   wherein the first material deposition technique comprises forming a free layer of the first MTJ element using a first combination of one or more of sputter, chemical vapor deposition, or plasma vapor deposition; and
   wherein the second material deposition technique comprises forming a free layer of the second MTJ element using a second combination of one or more of sputter, chemical vapor deposition, or plasma vapor deposition that is different from the first combination.

6. The apparatus of claim 1,
   wherein the first set of MTJ elements comprises the first anisotropy further based on a first material deposition technique used to generate a first interface between a tunnel barrier of a first MTJ element of the first set of MTJ elements and a first layer of the first MTJ element, the first layer comprising a free layer or a pinned layer; and
   wherein the second set of MTJ elements comprises the second anisotropy further based on a second material deposition technique used to generate a second interface between a tunnel barrier of a second MTJ element of the second set of MTJ elements and a second layer of the second MTJ element, the second layer comprising a free layer or a pinned layer.

7. The apparatus of claim 6,
   wherein the first material deposition technique comprises forming the first interface using a first combination of one or more of sputter, chemical vapor deposition, or plasma vapor deposition; and
   wherein the second material deposition technique comprises forming the second interface using a second combination of one or more of sputter, chemical vapor deposition, or plasma vapor deposition that is different from the first combination.

8. The apparatus of claim 1,
   wherein the first set of MTJ elements comprises the first anisotropy further based on a first volume of a free layer of a first MTJ element of the first set of MTJ elements; and
   wherein the second set of MTJ elements comprises the second anisotropy further based on a second volume of a free layer of a second MTJ element of the second set of MTJ elements, the second volume being different from the first volume.

9. The apparatus of claim 1,
   wherein the first set of MTJ elements comprises the first anisotropy further based on a first thickness of a tunnel barrier of a first MTJ element of the first set of MTJ elements; and
   wherein the second set of MTJ elements comprises the second anisotropy further based on a second thickness of a tunnel barrier of a second MTJ element of the second set of MTJ elements, the second thickness being different from the first thickness.

10. The apparatus of claim 1, wherein the first shape comprises an oval.

11. The apparatus of claim 1, wherein the first shape comprises a circle, a square, a square with rounded corners, a rectangle, or a rectangle with rounded corners.

12. The apparatus of claim 1,
wherein the first write speed is faster than the second write speed; and
wherein the first set of one or more MTJ elements is configured to hold a magnetization state that is less stable than the second set of one or more MTJ elements.

13. The apparatus of claim 1,
wherein the first write speed is faster than the second write speed; and
wherein the second set of one or more MTJ elements is configured to hold a magnetization state longer than the first set of one or more MTJ elements.

14. A single die comprising:
a first set of one or more magnetic tunnel junction (MTJ) elements comprising a first anisotropy based on a first shape of a free layer of a first MTJ element of the first set of one or more MTJ elements that results in the first set of one or more MTJ elements being configured to perform a first write operation at a first write speed;
a second set of one or more MTJ elements comprising a second anisotropy based on a second shape of a free layer of a second MTJ element of the second set of one or more MTJ elements that results in the second set of one or more MTJ elements being configured to perform a second write operation at a second write speed different from the first write speed, wherein the second shape is different from the first shape; and
processing circuitry configured to cache data at the first set of one or more MTJ elements for short-term storage and to store data at the second set of one or more MTJ elements for long-term storage.

15. The single die of claim 14, wherein an MTJ element of the first set of MTJ elements comprises a free structure, a pinned structure, and a tunnel barrier arranged between the free structure and the pinned structure.

16. The single die of claim 14, wherein the first set of MTJ elements comprise a first set of materials and the second set of MTJ elements comprise a second set of materials different from the first set of materials.

17. The single die of claim 14,
wherein the first set of MTJ elements comprises the first anisotropy further based on a first material deposition technique used to generate the first MTJ element of the first set of MTJ elements; and
wherein the second set of MTJ elements comprises the second anisotropy further based on a second material deposition technique used to generate the second MTJ element of the first set of MTJ elements.

18. The single die of claim 17,
wherein the first material deposition technique comprises forming a free layer of the first MTJ element using a first combination of one or more of sputter, chemical vapor deposition, or plasma vapor deposition; and
wherein the second material deposition technique comprises forming a free layer of the second MTJ element using a second combination of one or more of sputter, chemical vapor deposition, or plasma vapor deposition that is different from the first combination.

19. The single die of claim 14,
wherein the first set of MTJ elements comprises the first anisotropy further based on a first material deposition technique used to generate a first interface between a tunnel barrier of a first MTJ element of the first set of MTJ elements and a first layer of the first MTJ element, the first layer comprising a free layer or a pinned layer; and
wherein the second set of MTJ elements comprises the second anisotropy further based on a second material deposition technique used to generate a second interface between a tunnel barrier of a second MTJ element of the second set of MTJ elements and a second layer of the second MTJ element, the second layer comprising a free layer or a pinned layer.

20. The single die of claim 19,
wherein the first material deposition technique comprises forming the first interface using a first combination of one or more of sputter, chemical vapor deposition, or plasma vapor deposition; and
wherein the second material deposition technique comprises forming the second interface using a second combination of one or more of sputter, chemical vapor deposition, or plasma vapor deposition that is different from the first combination.

* * * * *